Sept. 10, 1957

M. PANICH 2,805,678

PNEUMATIC RELAYS

Filed Nov. 16, 1953

INVENTOR.
MICHAEL PANICH
BY
Raymond W. Junkins
ATTORNEY

INVENTOR.
MICHAEL PANICH

Sept. 10, 1957

M. PANICH 2,805,678

PNEUMATIC RELAYS

Filed Nov. 16, 1953

| SELECTOR POSITION | VALVE POSITIONS | | | | |
|---|---|---|---|---|---|
| | (5) | (4) | (3) | (2) | (1) |
| HAND | OPEN | CLOSED | OPEN | CLOSED | OPEN |
| AUTO | CLOSED | OPEN | CLOSED | OPEN | CLOSED |

FIG. 11

INVENTOR.
MICHAEL PANICH
BY
Raymond D. Junkins
ATTORNEY

United States Patent Office 2,805,678
Patented Sept. 10, 1957

2,805,678

PNEUMATIC RELAYS

Michael Panich, Mayfield Heights, Ohio, assignor to Bailey Meter Company, a corporation of Delaware Application November 16, 1953, Serial No. 392,132

8 Claims. (Cl. 137—86)

My invention relates to control systems operable automatically or manually to maintain substantially constant any desired electrical, thermal, chemical, physical, or other variable quantity or condition, through the control of a corrective agent or agents. More particularly, my invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value or manually for varying the condition as desired. In systems of this type it is usual to provide a measuring controller for the variable to be controlled, a manual-automatic selector station, one or more fluid pressure relays, and a regulating device (such as a valve) for the agent. These basic devices may be physically located adjacent one another or may be widely separated; due to conditions encountered or the desire of the purchaser.

In many instances the physical location of the measuring point may be far removed from the location of the control valve; and both, a considerable distance from availability to the operator who should be able to observe the value of the variable, the effect of the regulation, as well as to have available the possibility of removing the system from "automatic" and placing it on "manual" control.

Fluid pressure telemetering is known wherein a fluid pressure is developed continuously bearing a relation to the value of the variable or to the extent and direction of departure of the value from desired standard or set point. Such a measuring-controller is a transmitter which may be indicating or recording and may preferably be located adjacent the desirable point of measurement of the variable for many reasons. The fluid loading pressure is transmitted to the control valve for positioning the same, and the transmitter and valve may be widely separated. Intermediate the two is a manual-automatic selector station which may be conveniently located upon a control panel, with other measuring and controlling instrumentalities at a central location, under observation of an operator. It is frequently necessary, in such a system, to have one or more fluid pressure relays and these are preferably functionally located intermediate the transmitter and the selector station so that the relay effects may be available upon the regulating valve through the selector station but, under "manual" control, the relay is not effective upon the regulating valve as would be the case were it functionally located between the selector station and the regulating valve.

In such a system it has been usual to provide the measuring-controller (transmitter) with proportional band or sensitivity adjustability, as well as with set point or standard setting adjustability. But, if the transmitter is located far from the operator he is unable to observe, or change, these adjustments.

A principal object of my present invention is to provide a fluid pressure system of the type described with proportional band and set point adjustment possibilities remote from the transmitter and even remote from each other if desired; preferably the two adjustments may be convenient to the operator. Furthermore, the operator should have before him a continuous indication or record of the actual value of the variable as well as of the remotely chosen set point value to observe the effectiveness of the regulation at all times. It is therefore a further object of my invention to provide apparatus of this nature.

A particular object of the invention is to provide an improved fluid pressure relay, preferably of the ratio type, receptive of remote set point adjustability, and having proportional band or sensitivity adjustability.

Another object is to provide such a ratio relay, pneumatically actuated, for establishing an output or control pressure in predetermined ratio to incoming actuating fluid pressure established by a remote transmitter.

Still another object is to provide such an improved relay of a force-position-balance type having a plurality of force-balance systems interrelated by position-balance.

Still another object is to provide a fluid pressure relay with improved rate action possibilities.

A further object is the provision of manually actuated switch-over means for converting a relay to standardizing relay type through the introduction of reset, or vice versa. Another object is to provide an improved relay structure whereby rate action and/or reset action are readily adjusted.

Other objects will appear in the course of the following description.

Figure 1:
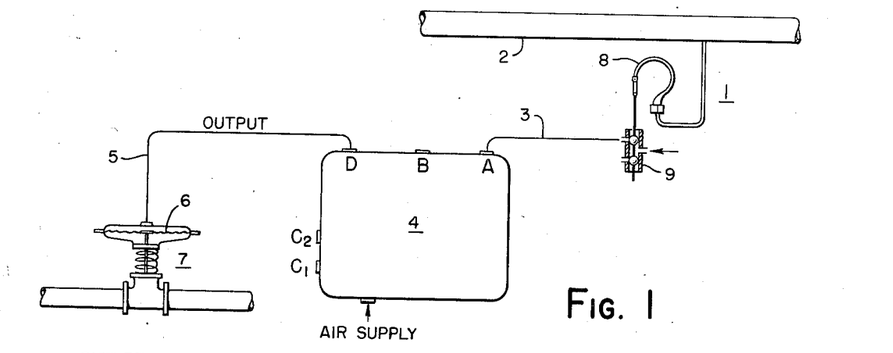
Fig. 1 diagrammatically illustrates a fluid measuring and controlling system embodying the invention.

Referring now to Fig. 1, I show therein, quite diagrammatically, a simple fluid pressure control system in which a measuring-controlling transmitter 1 is continuously sensitive to the value of a variable such as fluid pressure within the conduit 2 for continuously establishing in a pipe 3 a pneumatic fluid loading pressure within the range 5–25 p. s. i. g. proportionately representative of some range of values of the variable within the conduit 2. Such a range may be a range from zero to maximum expected value or a suppressed range within the confines of such extremes.

The pipe 3 joins the A chamber of a pneumatic relay 4 from which a control pressure leaves the D chamber by way of a pipe 5. Pressure within the pipe 5 is subjected upon the diaphragm 6 of a valve 7 for control of the same variable within the conduit 2 or of a different variable.

In the very schematic showing of Fig. 1 I have not included, in the fluid control circuit, a selector station such as was previously mentioned. However, the showing of Fig. 10 includes a selector station which will be later described.

Due to the limitation in space of the present drawing sheet, and the desire to have the components 1, 4 and 7 shown to as large a scale as possible, it is not feasible to accentuate the possibility of distance between said components. It will, however, be appreciated that, in view of my present invention, the transmitter 1 is preferably located immediately adjacent the desired point of pressure measurement for the conduit 2 to minimize measuring piping, lag in measurement, etc. The location of the valve 7 is fixed by design of the plant and may be at a considerable distance from the measuring point 1. Preferably, the relay 4 is located at a central panel board under the observation of an operator, although it may be located at any convenient spot. It is therefore apparent that the elements 1, 4 and 7 may be in juxtaposition or may be widely separated from each other. Through the agency of my present invention it is possible to locate these various elements as desired and still retain the desired interrelation of operation with most efficient observation and adjustability by the operator.

As previously mentioned, it is known to usually provide the measuring-controlling transmitter 1 with set point and proportional band adjustments; but they may then be completely inaccessible to the operator. I thus provide that these adjustabilities be available in the device 4 and/or in the selector station later to be described. By removing set point and proportional band adjustments from the transmitter 1 I preferably use therein a pressure establishing mechanism wherein the pneumatic loading pressure in the pipe 3 is continuously representative of pressure within the conduit 2. Pressure within the conduit 2 is available within a Bourdon tube 8 effective in positioning the movable element of a pilot valve 9 to establish in the pipe 3 a pneumatic loading pressure having a range of 5–25 p. s. i. for the selected range in the pressure of conduit 2. In other words, the 5–25 p. s. i. range of air pressure within the pipe 3 may represent 0–200, 0–1000, 200–300, or other selected range of pressure within the conduit 2 and under adjustability of the mechanism within the transmitter 1 in known manner. I will now describe in greater detail the pneumatic relay 4 which forms a principal feature of my present invention.

The use of pneumatic relays in such a fluid pressure measuring and controlling system is not new. My invention relates particularly to the form and construction and advantageous features of the one herein disclosed. In general it may be said that a pneumatic relay located between the pipes 3–5 may be useful for any of several reasons and to accomplish a wide variety of results. It may be advisable, due to the considerable distance between elements 1 and 7, that a relay of the straight 1–1 ratio be employed. On the other hand, in relation to proportional band operation it may be desirable to introduce a ratio between the pressure of pipe 3 and that of pipe 5, and such a ratio or proportional band adjustability may desirably be different under different operating conditions, for different systems, different processes, and the like. Thus proportional band adjustability is desirably available in the relay 4 to the operator, rather than having it remote from him by way of being located in the transmitter 1 or even adjacent the control valve 7. In the relay, of Fig. 1, I provide adjustability for set point and proportional band or sensitivity whereas, in the system described in connection with Fig. 10 I may provide remotely adjusted set point variation for the relay.

The present relay of my invention provides the possibility of readily and quickly converting the relay mechanism from that of a straight ratio relay to one employing reset action, and/or rate action or vice versa. The relay may, by proper adjustment and connection, be utilized for totalizing, ratio, averaging, or a wide variety of usages and applications. As will be brought out in the description the basic arrangement is widely flexible in that it is a very simple matter for an operator to change from one type of relay operation to another. The basic assembly may be used in a multitude of applications, it being only necessary to connect to the proper chambers and make the to be described selective adjustments.

Figure 2:
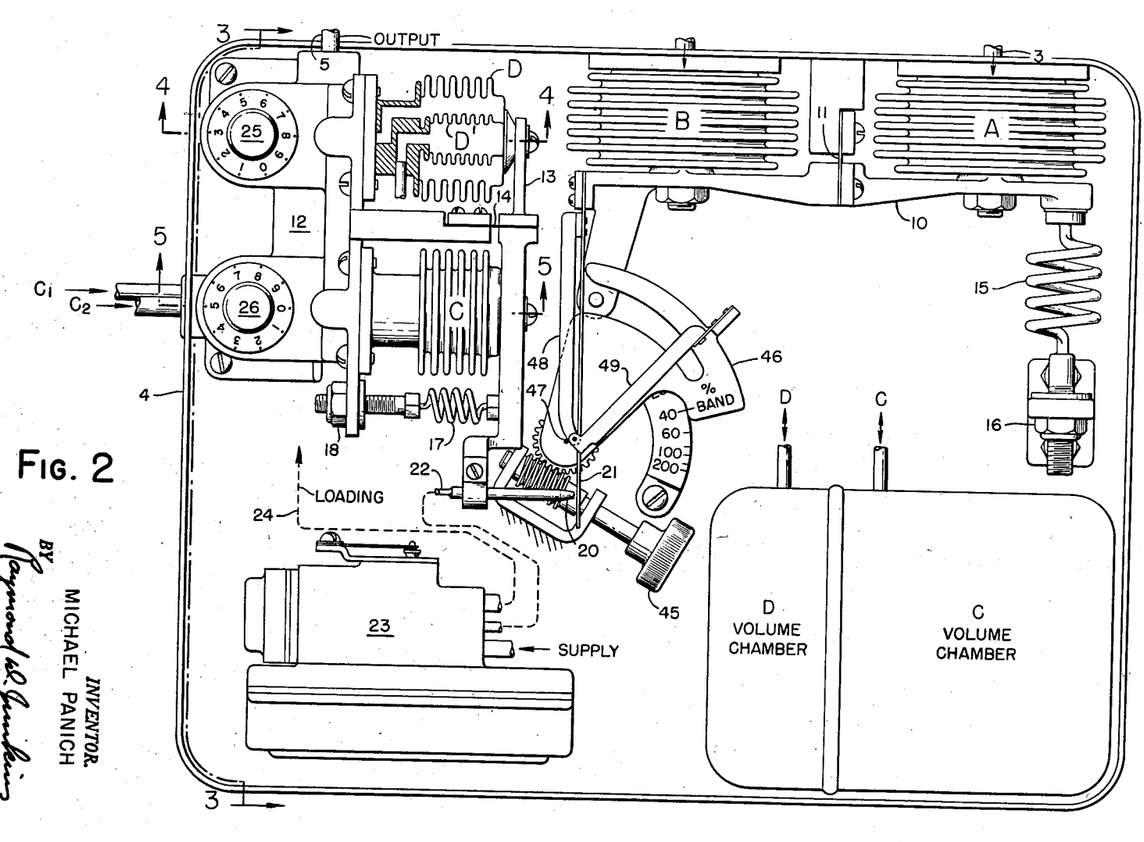
Fig. 2 is a somewhat diagrammatic view of the relay of Fig. 1.
Figure 3:
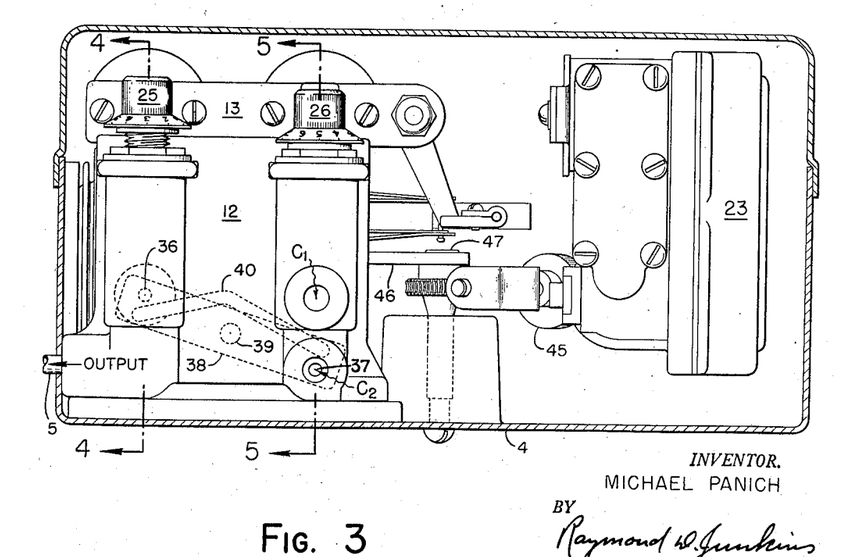
Fig. 3 is an elevation of the Fig. 2 relay, taken along the line 3—3 of Fig. 2, in the direction of the arrows.

Refer now particularly to Figs. 2, 3, 4 and 5 which show in substantially true proportion and arrangement the commercial arrangement of the relay 4. In these particular figures some of the interconnecting piping has been omitted for clarity and the functional operation will be explained more fully in connection with the other more diagrammatic views of the fluid pressure circuits. The pneumatic relay 4 is of the adjustable ratio type of force-position-force balance relay. Four expansible-contractible chambers, designated A, B, C and D (the latter enclosing a smaller chamber D'), take the form of metallic bellows although they might equally as well be diaphragms or other well known constructions which change the position of a movable wall thereof when subjected to varying pressures; in the present instance internally. In Figs. 1 and 2 chambers B and C are idle chambers, open to the atmosphere. Chamber A receives the loading pressure available in pipe 3, whereas chamber D receives the output control pressure of the relay 4 also available in pipe 5 leading to the regulating valve 7. Equal area bellows chambers A and B each have one wall fixed to the casing of the relay 4 and the movable wall of each is fastened to a force-balance beam 10 which is pivoted intermediate the A—B chambers by a leaf or hinge spring pivot 11.

In similar manner one wall of each of the C and D bellows chambers is fastened to a valve block 12 of the relay case and the movable wall of each of the C and D chambers is fastened in spaced relation to a force-balance beam 13 which is similarly hinge pivoted, intermediate the point of force application of the chambers C and D, by way of a leaf spring 14. While, in the present embodiment, the equal area chambers A and B are of a different size than the equal area chambers C and D, this is by no means limiting and is strictly a matter of areas, pressures, and other design calculations.

It will be observed in Fig. 2 that, with atmospheric pressure in chambers A and B, the force beam 10 is substantially parallel with the mounting wall of the relay casing and horizontal as viewed in the drawing. The equal area bellows C and D, when subjected to atmospheric pressure, have substantially equal extensions so that the force beam 13 is normally parallel to the support 12 and at right angles to the force beam 10.

Attached to the right hand end of the force beam 10 is a calibrating spring 15 having tension and/or compression adjustability 16 in known manner. Similarly, at the lower end of the force beam 13 is fastened a calibrating spring 17 having adjustability 18 for tension and/or compression. The calibrating springs 15 and 17 determine the travel distance of the spring end of the respective beams for various loading pressure to the A, B and C chambers. It will be understood that, while in Figs. 1 and 2 I show only the A chamber as receptive of an incoming loading pressure, it may, in certain usages, be desirable to make use of any or all of the receiving chambers A, B and C; or even of D.

The arrangement of Fig. 1, and the description of Fig. 2 in connection therewith, illustrates the simplest ratio relay usage wherein a preselected ratio is obtained between the loading pressure within the pipe 3 and the control output pressure within the pipe 5. Chambers B and C are idle chambers open to the atmosphere. With this same relatively simple ratio usage it is, under certain operating conditions, preferable to make use of the B chamber rather than the A chamber, but the operation is substantially identical except for reversal of forces and/or motion.

The force-balance beams 10 and 13 are not physically connected for the balancing of forces there-between but are functionally interrelated by way of the motion and position of cooperating parts carried, one by the one beam, and one by the other. Hence, the designation that this relay is of the force-position (or motion)-balance type. In connection with the two force-balance beams I utilize a nozzle-baffle couple. Supported by the lower end of the force beam 13 is a nozzle 20 movable in substantially a horizontal line. Supported by the left hand end of force beam 10 is a baffle 21 positionable in substantially a vertical travel by the beam 10 but, through the agency of certain elements of the assembly, the actual motion of the baffle 21 is in general along a horizontal line (looking at the drawing) approaching or receding relative to the nozzle 20. Actually the amount of motion of the nozzle 20 and/or the baffle 21 relative to each other, or as a couple, is quite minute and it is only important to point out that it is the relative motion of the one element of the couple relative to the other that is of importance in regulating the pressure in the output pipe 5, relative to the pressure of the incoming loading pressure in pipe 3.

Nozzle-baffle couples are not new in this art. When air under pressure is available in the somewhat flexible pipe 22 joining the nozzle 20, any departure of the nozzle 20 and baffle 21, one from the other, will result in an increase in bleed of air from pipe 22 to the atmosphere. The pipe 22 joins a booster relay 23 which may be of the type disclosed and claimed in the copending application S. N. 289,402 of H. H. Gorrie et al., now Patent 2,737,963. The loading pressure established by the booster relay 23, under the cooperative action of the nozzle-baffle couple, is available in a pipe 24 joining the valve block 12 and the output pipe 5. Functioning of the booster relay 23 will be explained in connection with Fig. 6.

A valve block 12 is provided with the necessary air passages joining the bellows C, D and D'. Providing the possibility of interconnecting or closing-off of certain of the passages are two throttling valve assemblies designated generally at 25 and 26; of which 25 may be termed the "Rate throttle" and 26 the "Reset throttle." As these assemblies are substantially identical one only will be described, namely that which is number 25 and reference may be had to Fig. 4.

Figures 4, 5:
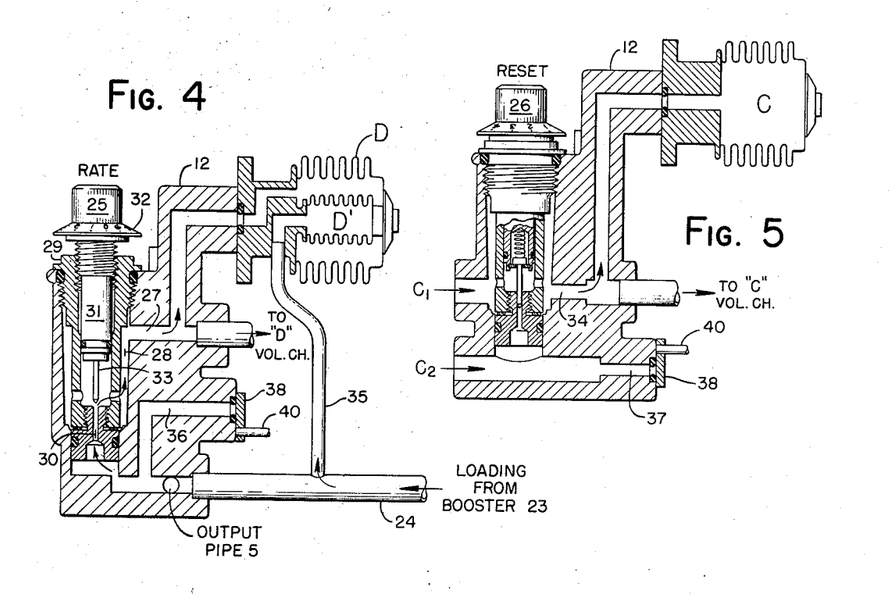
Fig. 4 is a sectional elevation, along the line 4—4 of Figs. 2 and 3, in the direction of the arrows.
Fig. 5 is a sectional elevation, taken along the line of 5—5 of Figs. 2 and 3, in the direction of the arrows.

The valve block 12 is provided with a substantially cylindrical chamber 28, open at the top to the atmosphere, and communicating at the bottom with pipe 24. Opening into the side of the chamber 28 is a passage 27 joining the D bellows interior. Threaded into the chamber 28 is a valve sleeve portion 29, sealed at top and bottom with O-rings, and having a central lower passage 30 communicating with pipe 24. The sleeve member 29 is arranged at its upper end to receive the threaded portion of a valve member 31 having an exteriorly located hand knob 32 graduated as shown in Fig. 2. The lower end of valve portion 31 is pressure sealed within the inner cylindrical wall of the sleeve member 29 by means of an O-ring. Extending from the lower end of the valve member 31 is the valve proper 33, arranged to cooperate in the valve passage 30 as knob 32 is turned, thereby moving assembly 31 axially of the sleeve 29. In the position shown in Fig. 4, the passage 30 is completely open to communicate the pipe 24 with the passage 27 as shown by the arrows. When valve knob 32 is manipulated in proper direction the valve assembly 31 moves downwardly and valve 33 enters the valve passage 30. Both the valve 33 and the passage 30 are formed to a slow taper so that a variable or throttling restriction to fluid flow through the passage 30 is formed as the member 33 enters and moves axially therein. In Fig. 4 the valve members 33—30 are shown in wide open position while in Fig. 5 the same members are shown in closed position wherein there is no communication through the valve assembly. Intermediate positions of the valve 33, relative to the valve seat 30, provide a variable restriction or throttling between the pipe 24 and the passage 27 or, in effect, an adjustable bleed of fluid pressure from pipe 24 to the interior of bellows D. With the long slow taper of valve 33 and its seat 30, the two might seize if seated too firmly. Fig. 5 shows that the valve stem 33 is spring pressed to avoid such possibility.

The assembly just described allows removal from valve block 12 of the complete assembly including valve 31 and valve sleeve 29, for examination, replacement of O-rings, adjustment of the various parts, and cleaning, and so that the assembly may be reinserted in valve block 12 without disturbing the relative adjustment of the parts. Furthermore, the assembly 25 is interchangeable with the assembly 26. The only difference between the showings of Figs. 4 and 5, in connection with these throttle assemblies is that (in Fig. 5) the external connection C1 communicates with the chamber 28 with the possibility of connecting to passage 34 directly past the exterior of valve sleeve 29 even when the valve is closed off. More will be said about the possibilities of pipe connections C1 and C2 hereinafter.

It will be observed in Fig. 5, that a passage 34 communicates with the interior of the C bellows. In Fig. 4 a branch pipe 35, from the loading pressure pipe 24, joins the interior of the bellows D' whereas passage 27 joins the interior of bellows D and is therefore effective within the annular space between the two bellows. In the present embodiment the effective area of D bellows is .79 sq. in. whereas that of D' bellows is .11 sq. in. so that the effective area ratio is approximately 1:7 between the D' bellows and the annular space around it. That is, between the area under control of pressure from pipe 35 and that area under control of pressure from pipe 27. More will be said about this later.

A readily adjustable means is provided for interconnecting the passages 36, 37 by a member 38 pivoted as at 39 (Fig. 3) and carrying a hollow tubing yoke 40 which serves as a handle for moving the assembly around the pivot 39. The end of the passages 36, and that of 37, are each provided with an O-ring as a pressure seal against the flat surface of member 38 in the position shown in Figs. 3, 4 and 5. In this position the passages 36, 37 are closed off from communicating with each other and are also sealed from the atmosphere by the O-rings engaging with the member 38. If the yoke 40 is grasped manually, and the assembly is pivoted around 39 until the ends of tubing 40 align with passages 36 and 37, then there is communication between the two passages 36, 37 in that position. The necessary stops are provided so that the assembly 38, 40 cannot be moved too far in either direction from the alternate "communicating" or "cut-off" positions. As will be pointed out in connection with the more diagrammatic figures of the drawing, this arrangement provides a ready means for making the reset throttle available by interconnecting the passages 36, 37 or, when they are not so interconnecting, to have the ends of the two passages sealed off from atmosphere. I am not aware of any previous relay of this general type having provisions for such ready change from a regular relay to a relay having reset or standardizing possibilities.

The principle of operation of the relay 4 is based upon a change in loading pressure to the A, B or C bellows (in the present example to the A bellows) causing motion of the baffle 21 and nozzle 20 with respect to each other so that a correct output pressure will be established at the D bellows for the desired condition of control.

At the same time application of the output control pressure in the D bellows repositions the nozzle 20 to reestablish the normal relation of the nozzle-baffle couple. A change in loading pressure to the C bellows (in the event the loading pressure is so connected) is always reproduced at a 1:1 ratio in the D bellows, whereas a like change in A bellows pressure or B bellows pressure will be reproduced in the D bellows at a ratio dependent upon the proportional band setting. Reverse action may be obtained by the application of the loading pressure to the B bellows, so that an increase or decrease in loading pressure will cause a respective pressure decrease or increase in the D bellows. Loading pressures applied to both the A and C bellows will cause an algebraic totalizing action to be obtained.

I will now explain the proportional band adjustment features provided in connection with the nozzle 20 and baffle 21, intermediate the force beams 10 and 13.

The motion of the couple baffle 21 for incremental movement of the left end of the force beam 10 is determined by the proportional band adjustment assembly. The "proportional band" is a ratio of the change in input loading pressure at the A or B bellows to the change in the output control pressure at the D bellows connection. The relay 4 is basically "ratio relay" and thus a change in the ratio between the effect of force beam 10 and that of force beam 13 is a change in proportional band. This is the sensitivity of the system. The "proportional band" may be expressed as:

Percent proportional band =

$$\frac{\text{Change in input loading pressure}}{\text{Change in output control pressure}} \times 100$$

The proportional band availability for this relay varies from about 300% to 5%. That is, a 3 p. s. i. change in input loading pressure to the A or B bellows is required to produce a 1 p. s. i. change in the relay output pressure at 300% or widest band; whereas a 1 p. s. i. change in input loading pressure will produce a 20 p. s. i. change in relay output pressure at 5% or narrowest band.

Turning of the proportional band adjustment 45 rotates the segment 46 around its pivot 47 and varies the angle between the baffle drive link 48 and the sector link 49. This angle, in turn, governs the amount of motion of baffle 21 with respect to the nozzle 20 for a given movement of the A—B force beam 10. Detailed theory and operation of the proportional band adjustability is described and claimed in the copending application S. N. 311,098 by H. H. Gorrie, now Patent 2,776,669.

Thus, the relay 4 is a ratio relay whereby movement of the sector 46, about its pivot 47, will vary the ratio of pressures between that imposed upon chamber A or B and that produced in chamber D. The ratio adjustment 45, 46 provides proportional band or sensitivity adjustment remote from the transmitter 1 and from the control valve 7. The relay 4 may usually be located on the rear of the central control panel accessible to the operator. Removal of set point adjustment and proportional band adjustment from the measuring-controller frees the same for producing an air pressure which is a true measure of the variable; allowing any number of remote indicators, or recorders to be actuated from the pressure within pipe 3, without distortion of the pressure in pipe 3 as would result were the adjustabilities in the device 1.

*Ratio relay*

Figures 6, 7:
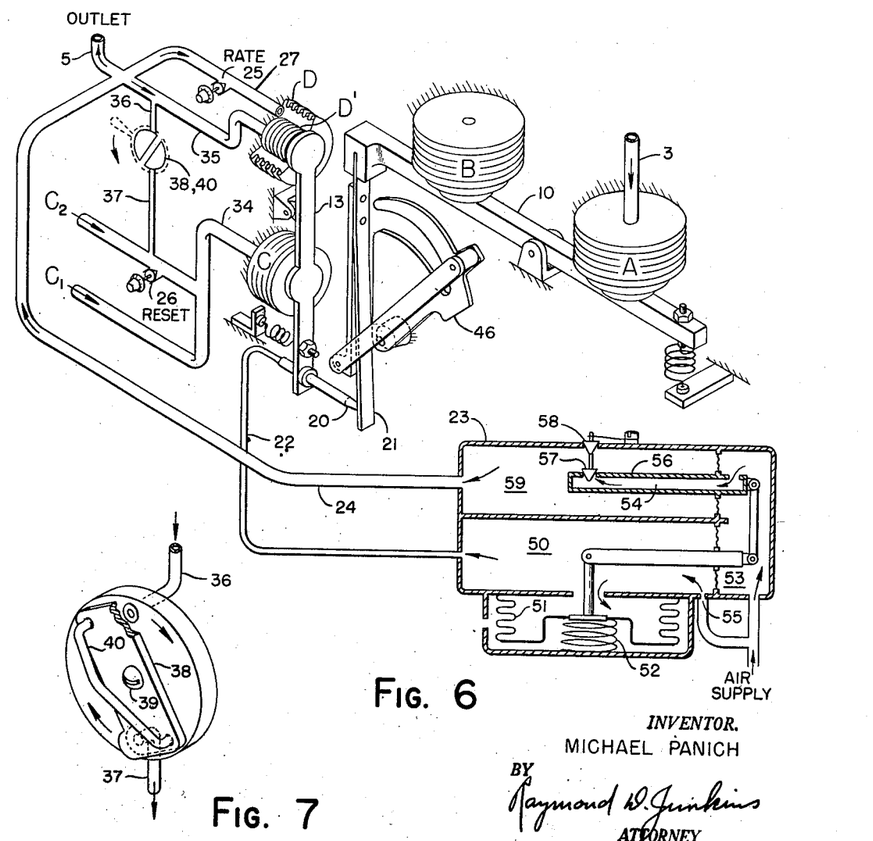
Fig. 6 is a somewhat diagrammatic illustration of the Fig. 2 relay for explanatory purposes.
Fig. 7 is a perspective view of the switch-over connection for changing a relay to a standardizing relay, or vice versa.

Refer now to Fig. 6 which is a very diagrammatic showing of the fluid circuits of the relay 4 and in connection with which I will explain the simpliest usage, namely, that of a simple ratio relay (Fig. 1).

The measuring signal is available in the bellows A from pipe 3. Bellows B, as well as connection points C1 and C2, are open to the atmosphere. The rate valve 25 is open and thus the output of the booster relay 23, available in the pipe 24, acts without restriction upon the full internal area of bellows D, D' and is available in the pipe 5 as an output control pressure leading to the valve 7 for positioning the valve. I have shown both rate throttle 25 and reset throttle 26 as fully open and the yoke interconnecting passages 36 and 37 is in the position of Figs. 3, 4 and 5 sealing off the passages 36 and 37 from each other and from the atmosphere.

The amplifier 23 is disclosed and claimed in the copending application S. N. 289,402 of H. H. Gorrie et al., now Patent 2,737,963, and is here shown in very diagrammatic form. Variable bleed from the nozzle 20 regulates the pressure in a chamber 50 and thereby within the large bellows 51 to control the output in pipe 24. The bellows 51 is loaded by a spring 52. Air, under supply pressure, is available in a chamber 53, in the passage 54 of a tubular arm which is pivoted through a flexible diaphragm, and in chamber 50 through a fixed orifice 55.

The assembly is shown in balance condition wherein the tubular arm 56 does not disturb the seating of a supply valve 57 or waste valve 58. If the pressure within chamber 50 increases, the result is a lowering of the left hand end of member 56 and an opening of the valve 57 to allow supply pressure to bleed into chamber 59. On the other hand if pressure within chamber 50 decreases, the free end of the movable member 56 moves in a cw. direction, opening the waste valve 58 and bleeding pressure from the chamber 59. Thus the bleed from nozzle 20, effective upon the bellows 51, controls the positioning of supply valve 57 and waste valve 58, for control of air supply pressure to or from the chamber 59 and output pipe 24.

Operation of the system of Fig. 1 for a simple ratio relay is as follows:

If pressure within the conduit 2 increases, then the Bourdon tube 8 will expand thus increasing the pneumatic fluid pressure within pipe 3 effective within the A bellows of relay 4. Increase in pressure within the A bellows pivots the force-beam 10 in a cw. direction, moving the baffle 21 toward the nozzle 20, thus decreasing the bleed of air from the nozzle and building up the pressure in pipe 22 and chamber 50 of the amplifier 23. Increase in pressure within the bellows 51 results in a ccw. movement of the free end of tubular movement 56 thus opening the supply valve 57 and causing an increase in pressure in chamber 59, pipe 24 and output pipe 5. Increase in pressure in pipe 5, acting upon the diaphragm 6 of valve 7, may be made to position the valve 7 in a closing direction, thus resulting in a decrease in pressure within conduit 2 back toward the desired or standard value from which it had departed in an increasing direction. Simultaneously, the increase in air loading pressure within pipe 24 acts directly upon the entire D+D' chamber area, causing a cw. rotational effect upon forcebeam 13 and resulting in a movement of the nozzle 20 toward the left (Fig. 2) away from baffle 21. The system comes to a state of equilibrium with the nozzle-baffle in predetermined position relation and with pressure within the D, D' bellows in predetermined relation, or ratio, to the new pressure within the A bellows.

A change in loading pressure applied to the A bellows (or to the B bellows) will be reproduced in the D bellows at a ratio dependent upon the proportional band setting. Thus, the output pressure in pipe 5 will bear a definite proportional relation to the input or measurement pressure of pipe 3. With a proportional band setting of 100% the ratio relay has a one to one ratio between input and output pressures and a direct proportionality if the input pressure is applied to the A bellows.

*Reversing ratio relay*

Application of the input pressure from pipe 3 to the B bellows reverses the output. When the input loading pressure is increased or decreased, the relay will produce a respective decrease or increase in its output pressure.

Ration control of two variables

If it is desired, for example, to maintain one flow rate in desired ratio to a second flow rate then a signal representative of the one flow rate is imposed upon the A bellows while that representative of the second flow rate is imposed upon B bellows. The relay is so adjusted that at 1:1 ratio (regardless of rates of flows) the A–B force-beam is balanced and, for example, output pressure exists in the pipe 5 and in the D bellows of 15 p. s. i. g., based on a supply pressure range of 5–25 p. s. i. g.

When air loading pressures are applied to more than one bellows of the relay, the relay output pressure is determined by the algebraic sum of the incoming pressures. Pressures applied to the A and C bellows act in the same direction on the relay output pressure, and a totalizing action is obtained. Pressures applied to the A and B bellows or to the B and C bellows oppose each other, and the relay output pressure reflects their difference.

Rate action

Still referring to Fig. 6, if rate action is to be introduced into the relay response, then the rate throttle valve 25 is moved toward throttling position and, while full pressure of pipe 24 is immediately available by way of connection 35 to the small bellows D', the same pressure is available to the annular space of bellows D only at a slow rate determined by the amount of throttling of the rate throttle 25. Thus, upon a change in output pressure within pipe 24, there is an immediate effect upon the D bellows end of force-beam 13 with a follow-up or continued effect in the same direction at a rate determined by the position of the rate throttle 25.

Rate, or derivative, action is not always necessary in a fluid pressure relay of this type. Through my invention including the double bellows D—D' and the rate throttle 25, in conjunction with the direct passage 35, I have the availability of rate action at any time. Without rate action the output pressure variations are simultaneously immediately effective upon the interiors of both the D and the D' bellows. With rate action inserted in the operating cycle, pressure variations in the output pipe are immediately effective within the D' bellows, and slowly within the larger D bellows at a rate determined by the position of the rate throttle 25.

Totalizing variables

Figures 8, 9:
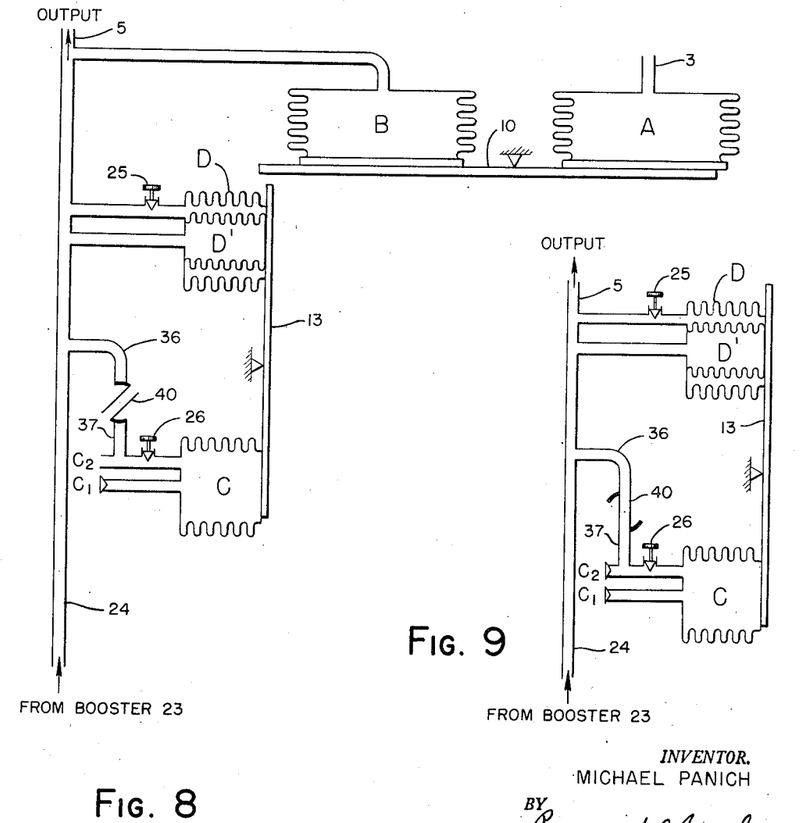
Figs. 8 and 9 are diagrammatic showings of passage arrangements for the relay, showing adjustment possibilities.

Fig. 8 very diagrammatically illustrates the connections of the relay where, for example, two fluid flows are totalized and control of any given variable is in accordance with the totalization of the measurement pressures, with rate action included. As seen in Fig. 8 the signal representative of one of the fluid flows is imposed upon the A bellows while that representative of the second flow is imposed upon the C bellows through piping connection C2. The output pressure, available in the pipe 24, from amplifier 23, acts directly upon the D' bellows interior and, through the adjustable rate throttle 25 upon the interior of the annular space between the D' bellows and the D bellows. At the same time pressure in pipe 24 is directly effective within the B bellows. In this illustration the throttle 26 is used to regulate the effect of the second flow variable through the entrance C2, by way of example, to show that one of the flows can be varied in its effect upon the force-balance system if desired. For example, one of the flows may be of a very fluctuating nature and it may be desired to apply an effect equivalent to an average of the fluctuations by way of the throttle 26. It will be seen that the two variables, effective within the A and C chambers, tend to add and that the resultant totalization effect must be applied to balance each of the force systems and therefore the output pressure is applied to the B bellows as well as to the D—D' bellows.

Reset action

Standardizing or reset action is obtained by applying to the C bellows any variations in output pressure at a regulable rate by way of the reset throttle 26. Fig. 9 illustrates the arrangement wherein assembly 38, 40 (Fig. 7) has been pivoted around its center 39 so that pipes 36, 37 are joined in communication by the pipe 40. Thus, output pressure of the amplifier 23, available in pipe 24, is also available through pipes 36, 40, 37 and the reset throttle 26, to the interior of bellows C. In this embodiment connections C1 and C2 are plugged.

In the standardizing or reset type of relay of Fig. 9 it is assumed that the incoming pressure is effective within chamber A and the output is effective within chambers D—D', with or without rate control through the agency of throttle 25, and the output pressure is also slowly effective within the chamber C. The function of the standardizing relay of Fig. 9 is to reproduce the loading relationship between chambers A and B and the outgoing control pressure in pipe 5, and by means of a regenerating action, to amplify the change in outgoing loading pressure until the incoming effect is returned to a predetermined value. This action gives a proportional plus reset response. A floating control of high sensitivity superimposed upon a positioning control which may be of relatively low sensitivity. The result, in the output pipe 5, is that upon change in the A chamber pressure, there is an immediate response in pressure change in pipe 5 in the same direction, followed by a continuing regenerative readjustment of the pressure in pipe 5 which may be in the same direction or in the opposite direction, until the condition is satisfied.

Reset action is not new in this art but I have provided an entirely new and improved apparatus for making a relay of this general type instantly changeable from a straight relay to a standardizing or reset relay, or vice versa, through manual manipulation of the parts 38, 40 as previously explained.

It will be appreciated that the relay of Fig. 9 is shown as having both rate and reset provisions. By backing the rate throttle 25 out of any restrictive position then the reset action alone is available. On the other hand, rate action may alone be available if assembly 38, 40 is turned to the position shown in Fig. 8.

The standardizing relay is a variation for obtaining proportional plus reset action. This combines proportional-position action (for continuous linear relation between value of control variable and position of final control element) with proportional speed floating action (continuous linear relation between value of control variable and rate of motion of final control element). The design or internal connections of the standardizing relay is such that, at balance, the air loading pressure in the A and/or B chambers is a standard or set point pressure, whereas the output pressure (C and D chamber pressure) is proportional to the value of the control i. e. from 0 to 100%. The C and D bellows are connected together by means of the pivot connection 40 through a reset throttle valve 26. The setting of the reset valve 26 determines the rate of change of relay output pressure for a change in input loading pressure. When the loading pressure in the A bellows increases above that of the B bellows or above the force exerted by the A—B spring, the relay is out of balance and will remain so until the pressure in the A chamber returns to its "balance" (usually, set point) pressure. With the relay unbalanced, due to the increase in pressure in the A bellows, the amplifier relay 23 will increase the pressure to the D and C bellows and will continue to do so until the A bellows pressure returns to set point. Although the pressure increase from the amplifier unit is delivered to both the C and D bellows, the reset throttle valve slows down the increase to the C bellows, thus maintaining an unbalance of forces on the C—D beam in such direction as to regulate the rate of change of relay output pressure.

When, due to the increase in relay output pressure, the control variable is changed to restore the pressure in the A bellows to "balance" or set point, the pressures in the C and D bellows equalize at the new increased output pressure, and the relay is balanced. Opposite action to that described above will occur for a decrease in pressure to the A bellows. An increase or decrease in pressure to the B bellows will result in an action in reverse of that for an increase or decrease in pressure to A bellows.

Figure 10:
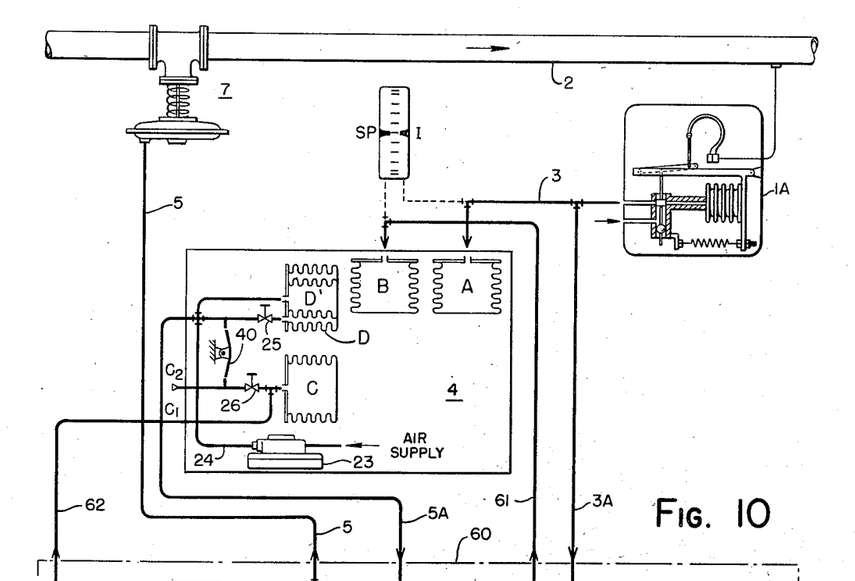
Fig. 10 diagrammatically illustrates a further embodiment of my invention in a fluid pressure measuring and controlling system.
Figure 11:
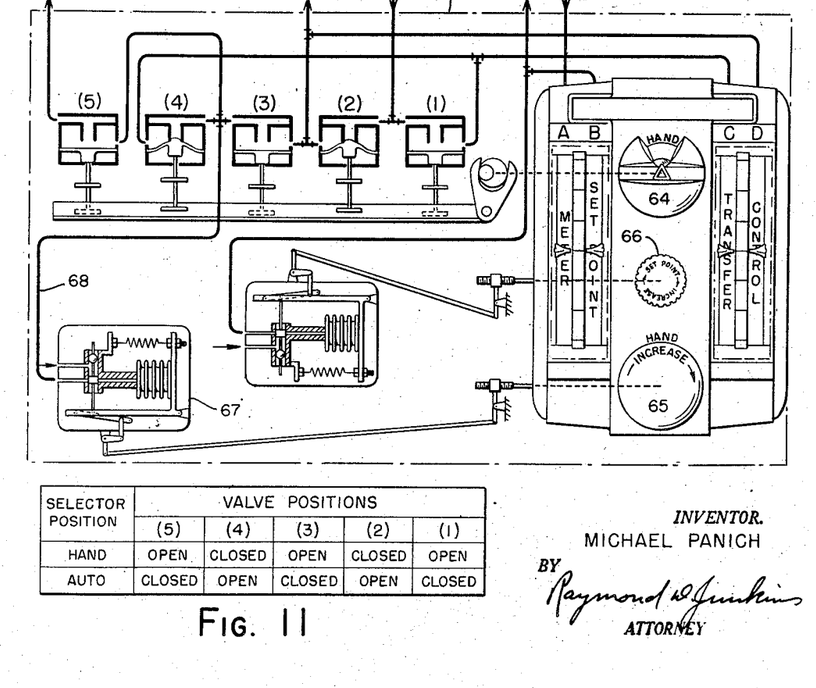
Fig. 11 is a tabulation of valve positions in connection with Fig. 10.

*Set point, Figs. 10 and 11*

I will now refer to Fig. 10 wherein I show a further embodiment of my invention including a selective automatic-manual control station provided with remotely adjustable set point loading pressure which may be imposed upon one of the chambers of relay 4.

The showing of Fig. 10 is again, quite diagrammatically, a simple fluid pressure control system in which the measuring-controlling transmitter 1A is sensitive to the value of fluid pressure within the conduit 2 and continuously establishes, in a pipe 3, a pneumatic fluid loading pressure within the range 5–25 p. s. i. g. proportionately representative of some range of values of the variable being measured. In this illustration I preferably use as the transmitter 1A a pressure establishing mechanism of the type disclosed and claimed in the copending application of H. H. Gorrie S. N. 169,751, now Patent 2,675,015.

I have indicated that the pipe 3 is branched as at 3A to enter a selector station 60. Additionally, the selector 60 is joined by pipes 61, 5A, 5 and 62, all having arrows indicating the direction of application of the fluid pressures therein. For instance, the pipes 3A and 5A transmit pneumatic pressures to the device 60, while the pipes 61, 5 and 62 transmit pneumatic pressures from the device 60. It will be seen that, in general, the measurement pressure in pipe 3A enters the device 60, while the control pressure in pipe 5 passes from the device to actuate or position the valve 7.

The device 60 provides selective possibilities and when the selector knob 64 is in "automatic" position, then the loading pressure in pipe 3, acting through the relay 4, is passed through the pipe 5A and selector 60 to pipe 5 for impression upon the diaphragm 6 of the valve 7. When it is desired to place the control of the valve 7 under "hand" domination from the location 60, it is possible to turn the knob 64 to its "hand" position (as shown in Fig. 10) and thereafter control the pressure in the pipe 5 by means of a hand control knob 65. A third knob 66 is provided through whose agency is established a fluid loading pressure representative of desired set point which is imposed upon the B chamber of the relay 4, by way of pipe 61. Thus, in the relay 4, the loading pressure from pipe 3, effective in the chamber A, is compared to a remotely established set point loading pressure effective in chamber B and, when the measured variable is in agreement with the set point value, the force-beam 10 will be in balance.

It does not appear necessary to go into further explanation of the selector station 60 with its possibility of remotely establishing a set point loading pressure for the B chamber of relay 4, as this arrangement is disclosed and claimed in the copending application of Paul S. Dickey, S. N. 287,074, now Patent 2,747,595.

In this illustration the relay 4 is formed to be a differential ratio standardizing relay in which all four of the chambers A, B, C and D are used. The pipe 5A carrying output or D chamber control pressure is joined to the C chamber by way of the yoke connection 40 and the reset throttle 26. The operation of the relay 4 as a standardizing relay has been explained. The rate valve 25 is available for use if found necessary.

In the system of Fig. 10 the selector station valve (5) is used in the "hand" position shown; the output pressure of device 67, available in a pipe 68, passing through the valve (5) which joins the C chamber of relay 4 by way of pipe 62 and entrance C1. Thus, the throttle 26 is effectively overruled by imposing upon the C chamber the pressure established manually by the device 67 and which is at the same time effective within the pipe 5 (by way of valve (3) of the selectror 60) for positioning the valve 7. Under "hand" control the measuring instrumentalities continue to impress their loading pressures upon the relay 4 and the final loading pressure output of the relay 4, available in pipe 5A and bellows D, would possibly be quite erratic at time of future switchover from hand to automatic. Thus, during "hand" control the throttle 26 is by-passed by the pipe 62.

Figure 12:
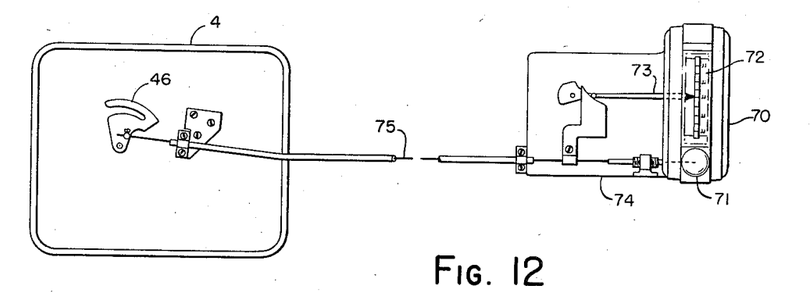
Fig. 12 diagrammatically illustrates remote manual proportional band adjustability.

In Fig. 12 I show, somewhat diagrammatically, the possibility of manually, remotely, adjusting the proportional band sector 46 of the relay 4. The relay 4 may be mounted upon the rear of a control panel. Upon the face of the control panel may show the device 70 having a manually turnable knob 71, an indicating scale 72 and a cooperating pointer 73. The indicating controlling face plate assembly 70 is shown at 90° to that portion of total assembly 74 which is preferably located directly behind the face plate 70. Within the mechanism 74 is the necessary cam or lever mechanism for positioning the pointer 73 as the knob 71 is turned. The knob 71 is also arranged to move a push rod or wire 75 mechanically positioning the sector 46 for varying the proportional band of the relay 4. Thus the out-of-sight relay 4, mounted behind the panel board, may have its set point manually adjusted by way of knob 71 from the face of the control panel and the position of the adjustment is indicated by the pointer 73 over the scale 72, the latter of which may be calibrated in percent proportional band.

While I have illustrated and described certain preferred embodiments of my invention it will be understood that this is by way of example only.

What I claim as new, and desire to secure by Letters Patent of the United States, is:

1. A valve system for a fluid pressure relay having a fluid pressure couple of two halves operated by a system of cooperating compressible chambers for each couple half, including in combination, first and second compressible chambers as the portion of the system operating one couple half, a valve block upon which the chambers are mounted and having internal passages communicating with the interior of the chambers, a passage manifold in the valve block in which the couple output is developed and directly connected with the first compressible chamber, an interconnecting passage between the passage manifold and the second compressible chamber, a first manually operable restrictive valve in the interconnecting passage, a manually operable on-off valve in the interconnecting passage, and a passage in the valve block joining the interconnecting passage between the first restrictive valve and the on-off valve with an exterior opening of the block.

2. The valve system of claim 1 wherein the first compressible chamber is comprised of two concentric sections with the inner section having the direct connection to the passage manifold, including, a rate passage connnecting the passage manifold to the annular space between the inner and outer sections, and a second manually operable restrictive valve in the rate passage.

3. The valve system of claim 2 wherein the manually operable on-off valve includes, a plate member pivoted in sliding contact with a flat external surface of the valve block, a hollow tube yoke mounted on the plate to form unrestricted communication between two of the terminals of interconnecting passage portions coming to the flat external surface, and substantially flush O-ring seals mounted at the terminals of the interconnecting passage portions.

4. The valve system of claim 3 wherein; the first and second manually operable restrictive valves structurally each comprise, a chamber in the valve block open to the atmosphere at one end and communicating with the block passage to be restricted at the other end and at an intermediate point, a sleeve member screwed into the chamber from the open end and engaging the chamber wall to seal between the communications with a block passage to be restricted, a valve passage in the sleeve member between the communications with the block passage, and a valve member manually screwed into the sleeve member and cooperating with the valve passage to restrict the interconnecting passage as determined by the position to which the valve member is manually screwed.

5. The valve system of claim 4 wherein, in the restrictive valves, a first O-ring seals between the sleeve member and the chamber at the atmosphere end, and a second O-ring seals between the sleeve member and the chamber between the communications with the block passage.

6. The valve system of claim 5 wherein, in the restrictive valves, a third O-ring on the valve member is carried between the valve member and the sleeve member to provide friction during the screw travel of the valve member.

7. The valve system of claim 6 wherein, in the restrictive valves, the valve passage is carried in a separable portion of the sleeve member.

8. The valve system of claim 7 wherein, the valve stem of the valve member and the cooperating valve passage are formed in a long slow taper, and a spring is provided within the valve member to press the stem toward the valve passage as the valve member is screwed into the sleeve member.

References Cited in the file of this patent

UNITED STATES PATENTS

| | | |
|---|---|---|
| 2,285,540 | Stein | June 9, 1942 |
| 2,507,606 | McLeod | May 16, 1950 |
| 2,508,843 | Semak | May 23, 1950 |
| 2,517,051 | Swenson | Aug. 1, 1950 |
| 2,633,858 | Eckman | Apr. 7, 1953 |
| 2,638,919 | Glarridge | May 19, 1953 |
| 2,658,516 | Luppold et al. | Nov. 10, 1953 |

FOREIGN PATENTS

| | | |
|---|---|---|
| 677,632 | Great Britain | Aug. 20, 1952 |